(12) United States Patent
Teradaira

(10) Patent No.: US 6,516,440 B1
(45) Date of Patent: Feb. 4, 2003

(54) PRINTER AND A CONTROL METHOD FOR SAVING DATA FROM VOLATILE TO NONVOLATILE MEMORY IN THE PRINTER

(75) Inventor: Mitsuaki Teradaira, Shiejiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/312,039

(22) Filed: May 14, 1999

(30) Foreign Application Priority Data

May 14, 1998 (JP) .......................................... 10-132072

(51) Int. Cl.7 ............................................... G11C 29/00
(52) U.S. Cl. ........................................ 714/763; 714/798
(58) Field of Search ............................. 714/22, 6, 763, 714/764, 798; 711/170; 713/1; 364/200; 365/228

(56) References Cited

U.S. PATENT DOCUMENTS

| | | | | |
|---|---|---|---|---|
| 4,458,307 A | * | 7/1984 | McAnlis et al. .............. | 714/22 |
| 5,479,467 A | | 12/1995 | Katsumata | |
| 5,533,190 A | * | 7/1996 | Binford et al. ................ | 714/6 |
| 6,145,068 A | * | 11/2000 | Lewis .......................... | 711/170 |
| 6,209,088 B1 | * | 3/2001 | Reneris .......................... | 713/1 |

FOREIGN PATENT DOCUMENTS

| | | |
|---|---|---|
| EP | 0 345 060 | 12/1989 |
| JP | 6-067986 | 3/1994 |
| JP | 6-067987 | 3/1994 |

* cited by examiner

*Primary Examiner*—David Ton
(74) *Attorney, Agent, or Firm*—Michael T. Gabrik

(57) ABSTRACT

A method for controlling the saving of information regarding printer operating conditions to its nonvolatile memory is provided. The method decreases the data save time to the printer's nonvolatile memory, and minimizes the effect that saving to the nonvolatile memory has on printer operation. The method groups printer status data relating to the printer's operating conditions into different groups or blocks of data and allocates each block to a different storage area in the printer's volatile memory and its nonvolatile memory. A particular data group stored in its assigned storage area in the volatile memory is saved to the corresponding storage area in the nonvolatile memory when one or more trigger events related to printer control to which that particular data group is responsive occur.

24 Claims, 7 Drawing Sheets

|  | Area 1 | Area 2 | Area 3 | Area 4 | Area 5 | Area 6 |
|---|---|---|---|---|---|---|
| Printer Power ON | Store |  |  |  |  |  |
| Specific Time Interval |  | Store |  |  | Store |  |
| Specific Process Executed |  | Store | Store | Store | Store |  |
| Specific Interval Of Change In Counter Value |  | Store |  | Store | Store |  |
| Reset Signal Detected |  |  |  |  | Store |  |

PRINTER AND A CONTROL METHOD FOR SAVING DATA FROM VOLATILE TO NONVOLATILE MEMORY IN THE PRINTER

BACKGROUND OF THE INVENTION

1. Field of the Invention

The present invention relates to a printer and method of controlling the saving of information relating to printer operating conditions from volatile memory to nonvolatile memory, and a printer that employs the control method.

2. Description of the Related Art

Correct printer operation requires that the printer have access to information regarding its operating conditions, including certain status information such as the quantity of ink remaining, the time of the last head cleaning, print head location, the amount of roll paper remaining, and count values indicative of such things as the printed character count, the accumulated paper feed amount, and the total operating time. When the printer stops in the middle of a printing job due to some error or other event, such as the power switch being turned off, a power failure, or a printer reset, it is very desirable to know such status information so that the operating conditions of the printer at the time the interruption occurred can be determined and an appropriate process for recovering from the interruption executed.

In conventional printers, status information regarding printer operating conditions as described above (referred to as "printer status data" below) are maintained and updated in a volatile memory such as a DRAM, and saved at regular intervals to a nonvolatile memory such as an EEPROM (Electrically Erasable Programmable ROM), a flash memory, or other type of nonvolatile memory. Each time the printer resumes operation, the printer status data is copied from the nonvolatile memory into the volatile memory.

As noted above, printer status data is written into the nonvolatile memory at specific time intervals during the operation of the above-described conventional printer. More specifically, at the end of a predetermined time interval, as measured by an internal timer, whatever process the printer is currently performing is interrupted, and the printer CPU is diverted to the task of writing (saving) such data in the nonvolatile memory. By regularly saving the printer status data to the nonvolatile memory, the ability of the printer to recover from printing interruptions and restore the operating status of the printer to its pre-interruption state is improved.

It is obviously not possible to predict when an error or other interruption is going to occur. For this reason, it desirable for the interval between saves of printer status data to the nonvolatile memory to be as short as possible in order to assure that the most recent condition of the printer before an interruption occurs can be determined with the greatest possible accuracy.

When the printer CPU is executing a printing operation or otherwise processing data and is interrupted in order to execute the process of writing printer status data to the nonvolatile memory, the interrupted CPU task (printing or data processing in this example) stops until the writing process is completed. Printer throughput therefore decreases. As the amount of printer status data being tracked and saved to nonvolatile memory increases, the saving time also increases, and can increase to a level at which the decrease in printer throughput can no longer be ignored. It is therefore desirable that the time required for copying data from the volatile memory to the nonvolatile memory each time such data is saved be as short as possible irrespective of the amount of printer status data to be saved.

One of the problems with conventional saving methods is that they copy the entire content of the volatile memory into the nonvolatile memory whenever data saving is initiated, regardless of whether all printer status data in the volatile memory has changed since the last time it was saved. This is inefficient and also reduces the remaining service life of the nonvolatile memory which is inversely related to the number of write cycles to it per unit time. Thus, when data that has not changed is saved to the nonvolatile memory, the limited number of available write cycle operations is needlessly reduced. As a result, the total service life of the nonvolatile memory is potentially shortened.

OBJECTS OF THE INVENTION

Therefore, it is an object of the present invention to overcome the aforementioned problems.

It is another object of the present invention to shorten the time during which data is saved to nonvolatile memory and thereby reduce the adverse effect that the saving process has on normal printer operation.

It is a further object of the present invention to prevent the unnecessary saving of data to nonvolatile memory and thereby improve nonvolatile memory service life.

SUMMARY OF THE INVENTION

To achieve the above objects, the present invention provides a method for controlling the saving of information regarding printer operating conditions (printer status data) to the nonvolatile memory in the printer. Also provided is printer embodying the save control method. The method comprises the following steps:

(a) grouping the printer status data into a plurality of different data groups and pre-allocating each of the data groups to a corresponding one of a plurality of storage areas in both the printer's volatile memory and nonvolatile memory, wherein the saving of each data group to the nonvolatile memory is responsive to at least one of a plurality of trigger events; and (b) generating a command to save a select number of data groups from the volatile memory to the nonvolatile memory when any one of the trigger events occurs; and (c) saving a particular data group stored in its pre-allocated storage area in the volatile memory to its corresponding storage area in the nonvolatile memory in response to the generated save command when any one of the plurality of trigger events to which that data group is responsive occurs.

By selectively saving only to those storage areas in nonvolatile memory corresponding to a specific trigger event, and not saving to other parts of the nonvolatile memory at that time, the write time is shortened and nonvolatile memory life is improved.

The specific trigger events of this control method preferably include detection of a reset signal from a host computer. In this case, the printer is reset based on this reset signal after step (c).

Preferably, the specific trigger events further include: the lapse of a specific time interval, turning printer power on and off, and specific control events in printer operation. Specific control events in printer operation preferably include print head cleaning, ink cartridge or roll paper replacement, and such operating errors as an increase in print head temperature or disconnection of the carriage transportation belt.

Preferably, the printer status data saved to the nonvolatile memory is also divided into a first data set and a second data set where each data set comprises one or more data groups. In this case, there is an additional step (c)(1) of saving the first data set to the nonvolatile memory at the lapse of a specific time interval; and a step (c)(2) of saving the first and second data sets to the nonvolatile memory and reinitializing the specific time interval counter after a specific printer operation event occurs.

Much of the data saved to the nonvolatile memory is updated in response to the occurrence of a particular control operation, such as the events described above, occur. It is therefore possible to minimize damage from data loss when a problem occurs by writing to the nonvolatile memory after the control event has been completed. By also writing time interval responsive data to the nonvolatile memory at the same time, and also restarting the time counter, an increase in the frequency of data updates to the nonvolatile memory can be prevented.

An error detection code is preferably stored in each storage area, in which case there is also an additional step (d) of checking errors in the storage areas.

In this case, the error detection step checks for errors in the data of a particular storage area when that data is read from the nonvolatile memory and temporarily stored to volatile memory. Further, preferably, the error detection step checks for errors in data after that data is written to the nonvolatile memory from volatile memory.

The control method preferably includes an additional step for writing specific initialization data to each storage area in the volatile memory and the nonvolatile memory from which an error-detected data group has been read or to which an error-detected group has been written. This makes it possible to minimize printer operating problems when a data error occurs.

The present invention also relates to a printer having a memory structure to accommodate the control method. Thus, the printer comprises:

a volatile memory that stores printer status data relating to printer operating conditions, the printer status data being pre-allocated into a plurality of data groups, the volatile memory having a plurality of storage areas allocated therein, each storage area corresponding to one of the data groups;

a nonvolatile memory that temporarily stores the printer status data, the volatile memory having a plurality of storage areas allocated therein corresponding to the plurality of storage areas allocated in the nonvolatile memory;

a controller that generates a save command to save a select number of the data groups stored in the volatile memory to the nonvolatile memory when any one of a plurality of trigger events occurs; and a read/write unit that saves a particular data group stored in its pre-allocated storage area in the volatile memory to its corresponding storage area in the nonvolatile memory in response to the generated save command when any one of a plurality of trigger events to which that data group is responsive occurs.

The printer status data saved to the nonvolatile memory is preferably pre-divided into a first data set and a second data set. In this case, the printer preferably comprises: a counter for counting a specific time interval; a monitor that detects an occurrence of any one of the trigger events relating to printer operation; a first read/write unit that saves the first data set to nonvolatile memory at the lapse of the specific time interval counted by the counter; a second read/write unit that saves the second data set and the first data set to the nonvolatile memory when the monitor detects the occurrence of at least one specific event in printer operation; and an initialization unit that initializes the counter when the second read/write unit saves data in the nonvolatile memory.

Each storage area preferably comprises a data area for storing its corresponding data group and a checksum area for storing an error detection code.

Preferably, at least one of the plurality of storage areas in the nonvolatile memory is further divided into a plurality of substorage areas. In this case, each substorage area is further preferably divided into a data area and a sequence area for storing sequence data representing the sequence of use of the substorage areas.

The data groups written to the nonvolatile memory when a reset signal is detected are particularly important for printer control. It is therefore necessary to write these data groups to the nonvolatile memory when specific events other than a reset signal occur. Because these data groups are frequently stored, the number of writes to the corresponding storage area inevitably increases. However, by providing plural substorage areas for this frequently updated data, the most recent data can be written sequentially to the subarea following the last subarea used when the data groups are updated. Frequent writing to a single part of the nonvolatile memory can thus be prevented, and a decrease in the nonvolatile memory life resulting from frequent use of only part of the nonvolatile memory can be avoided.

It is also necessary to know which substorage area contains the most recent data when data is read from the nonvolatile memory. Because sequence data is also stored in each substorage area together with its assigned data group, the most recent data can be obtained by simply referring to the sequence data.

Preferably, a checksum area for storing an error detection code is also provided in each substorage area. By thus recording an error detection code, it is also possible to detect data errors when data is read from nonvolatile memory. Furthermore, if an error is detected in the most recent data, the next-most-recent data can be retrieved and checked for errors. If there are no errors in this next-recent data, it can be written to volatile memory. As a result, printer operating errors resulting from possible data errors can be further minimized.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts.

DESCRIPTION OF THE PREFERRED EMBODIMENTS

Figure 1:
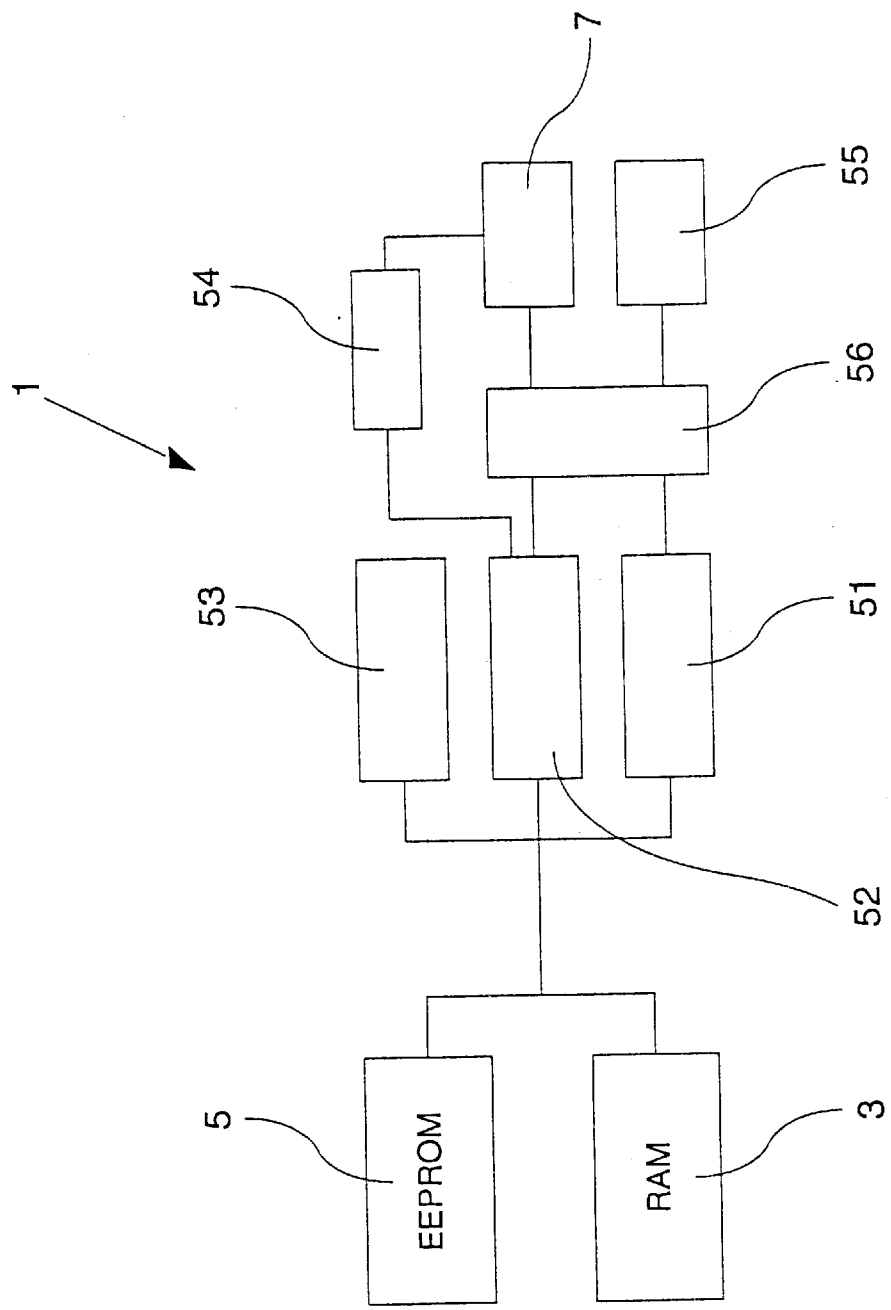
FIG. 1 is a functional block diagram of a printer embodying a control method according to a preferred embodiment of the present invention.

The preferred embodiment of the present invention is described below with reference to the accompanying figures, of which FIG. 1 is a block diagram of a printing apparatus in which a control method according to this preferred embodiment is implemented.

The printer 1 shown in FIG. 1 is, by way of example only, a serial ink jet printer capable of printing to both cut-sheet forms and roll paper. Printer 1 comprises a nonvolatile memory such as an EEPROM 5 for storing information relating to various operating conditions of the printer 1. Such information is referred to below as printer status data. Printer 1 further comprises a volatile memory such as a RAM 3 for temporarily storing printer status data for use during operation of the printer 1. Printer 1 further includes various control units 51 to 56 for controlling the copying (saving) of this data from the RAM 3 to the EEPROM 5 and vice versa, and a counter 7.

Figures 3, 4:
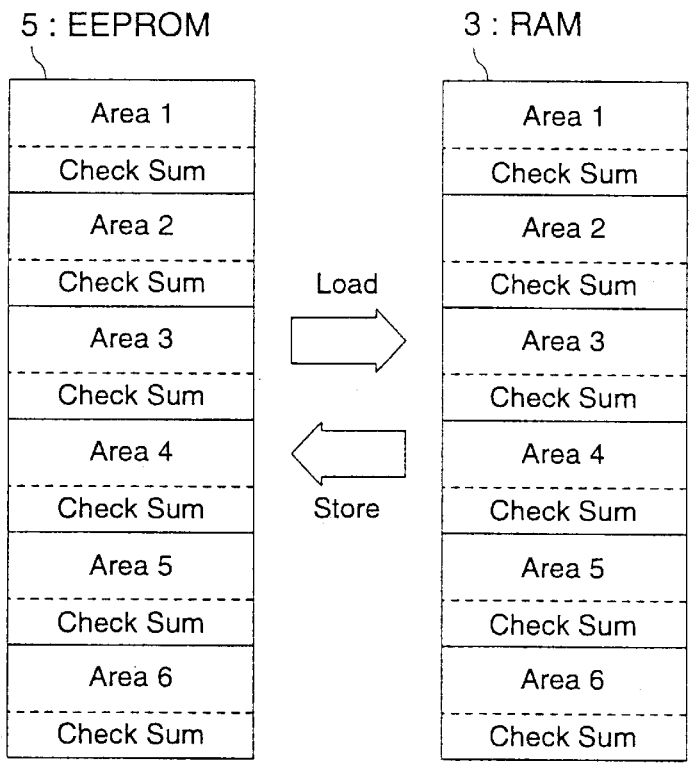
FIG. 3 shows an example of the logical structure of the data storage areas in a nonvolatile memory and a volatile memory used in a control method according to a preferred embodiment of the present invention.
FIG. 4 is a table showing a relationship between storage areas and events that trigger the saving of data from the volatile memory to the nonvolatile memory according to the present invention.

The RAM 3 and EEPROM 5 (or parts thereof) are each logically divided into a plurality of storage areas for storing printer status data which includes certain status information such as the quantity of ink remaining, the time of the last head cleaning (head cleaning time), print head location, the amount of roll paper remaining, and count values indicative of such things as the printed character count, the accumulated paper feed amount, and the total operating time. The printer status data is divided into a corresponding plurality of discrete data blocks (data groups) and each data group is assigned to a respective one of the storage areas. In the illustrated embodiment, there are six storage areas (Area 1–Area 6) and the printer status data is grouped into six data groups, as shown in FIGS. 3 and 4. As will be explained in more detail below, the individual data groups are saved at different times.

In addition to being grouped into discrete data blocks, the printer status data is also divided into a plurality of different sets of data based on the trigger event that triggers the save operation. Each set of data includes one or more data groups. The sets of data include a first set that is periodically saved to the nonvolatile memory (i.e., EEPROM 5) at predetermined times, and a second type that is saved to the EEPROM 5 when one or more specific control events occur.

To distinguish between the periodic saving of the first data set, the saving of the second data set is also referred to herein as "event driven." Despite this distinction, the term "trigger event" as used herein includes both the generation of a signal from the counter 7 indicating the lapse of a predetermined time period to trigger periodic saving as well as the occurrence of a specific control event. As will be appreciated from the following description, while the first and second sets of data are different, they may overlap in the sense that one or more data groups may belong to both sets.

It should be noted that, in addition to the first and second sets of data groups, there are three other sets of data groups, as shown in FIG. 4.

In operation, when a predetermined time period, as determined by the counter 7, lapses, a controller 56 issues a command to a first read/write unit 51 to copy the content of the first set of data groups from RAM 3 to EEPROM 5.

One of the control events that trigger the saving of the second set of data groups include, for example, print head cleaning. When a print head cleaning event occurs, a monitoring unit 55 obtains information from a timer to determine whether the elapsed time since the last print head cleaning exceeds a predetermined duration of time. If so, the controller 56 issues a command to a second read/write unit 52 to copy the content of the second data set from RAM 3 to EEPROM 5. A command for copying the content of the first data set to EEPROM 5 is also issued at this time so that both the first and second data sets are saved to EEPROM 5.

An initialization unit 54 is provided which reinitializes the counter 7 whenever data is written to EEPROM 5 by the second read/write unit 52.

Note that when the printer power is turned on, a third read/write unit 53 loads the data from EEPROM 5 into RAM 3.

It should be further noted that the first read/write unit 51, second read/write unit 52, third read/write unit 53, initialization unit 54, and controller 56 are preferably realized using a program-controlled microprocessor and a storage device for storing the program code (i.e., software) that causes the microprocessor to perform the corresponding operations. This storage device could be, for example, ROM 4 or temporary storage such as RAM 5, and more broadly may include any of a variety of external and internal machine readable mediums including magnetic tape, magnetic disk, or optical disc. If not already in RAM 5, the program code may then be copied into RAM 5 and executed by CPU 2.

The monitoring unit 55 is also preferably realized using a program-controlled microprocessor, a storage device for storing program code implementing the corresponding operations, a timer, and a sensor (not shown in the figures) for detecting a change in the operation of printer 1. Preferably, the same microprocessor and storage device used for realizing the first, second and third read/write units 51, 52, and 53 respectively, the initialization unit 54, and the controller 56 is also used to implement the monitoring unit 55.

Figure 2:
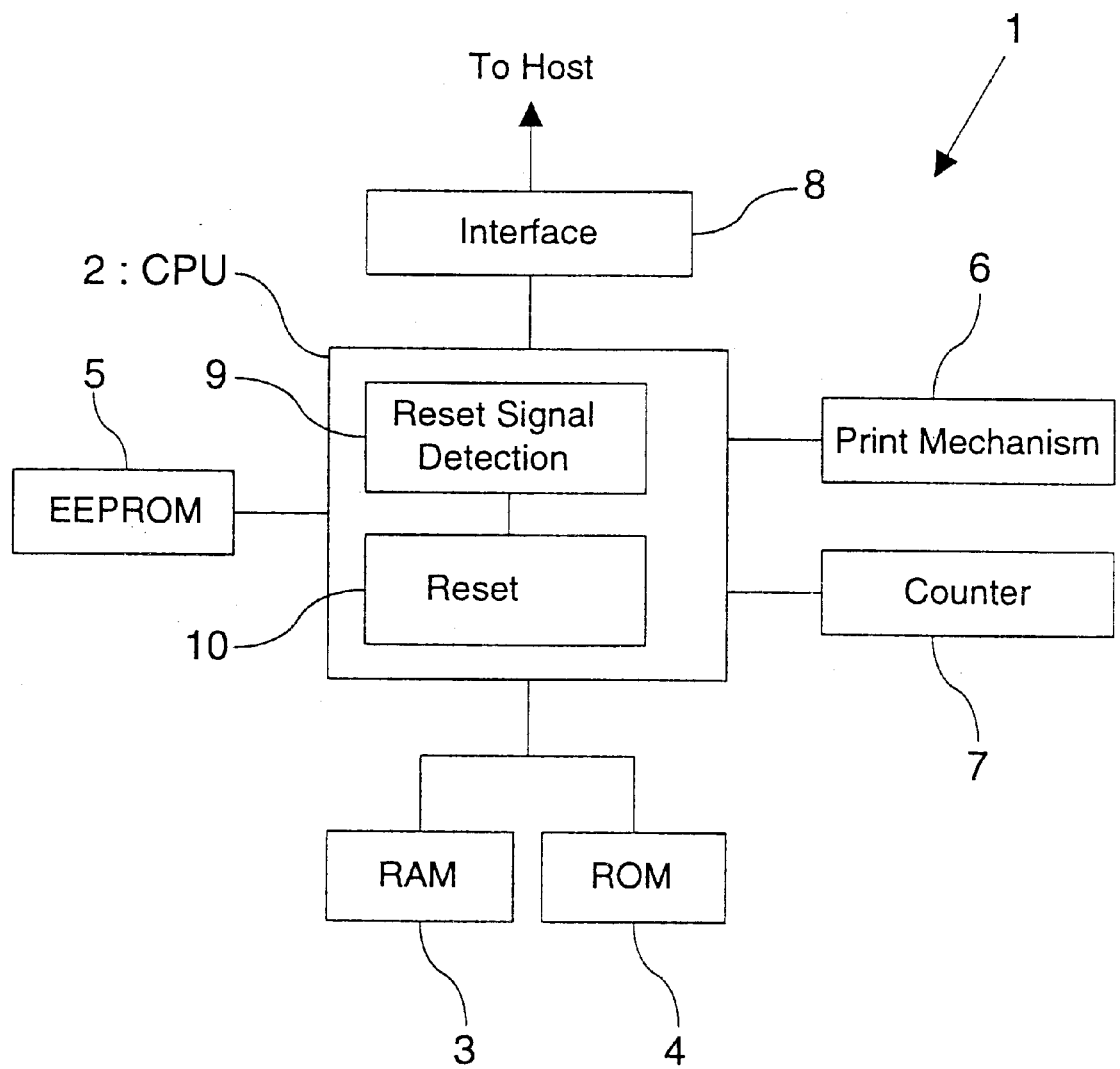
FIG. 2 is a circuit block diagram of a printer embodying a control method according to a preferred embodiment of the present invention.

FIG. 2 is a circuit block diagram of printer 1 embodying a control method according to embodiments of the present invention.

As shown in FIG. 2, printer 1 comprises a CPU 2 (which may represent the microprocessor mentioned above) for controlling overall printer operation, RAM 3 as a main working memory, ROM 4 for storing control data and a control program, EEPROM 5 for storing printer status data as described above, print mechanism 6 for printing on a print medium by means of a print head, counter 7 for counting the passage of time, and interface 8 for connection to a host computer. The CPU 2 loads program and control data from ROM 4 and printer status data from EEPROM 5 into RAM 3, and controls printer operation based on the program and control data in RAM 3. When the power to printer 1 is turned on, the printer 1 is then initialized based on the loaded data. The printer 1 (and more specifically CPU 2) then awaits a command from the host.

The printer 1 has various sensors (not shown in the figures) for monitoring its the operating conditions. The printer status data in RAM 3, which is generated in response to the operating conditions detected by the sensors, is sequentially updated and is copied and saved in specific storage areas in EEPROM 5 in response to specific trigger events, as described in more detail below. The printer status data saved in EEPROM 5 is then loaded into RAM 3 when the printer 1 is initialized or reset, and is thus used as the initial data for printer control.

For example, the head cleaning time described above records the time of the last head cleaning event. The CPU 2 uses this head cleaning time to determine the timing of the start of the next head cleaning event, and initiates head cleaning at that time.

In addition, when a printer error occurs, causing the printer to stop operating in the middle of a print job, for example, the printer 1 is restored to its pre-error operating condition by reading from EEPROM 5 information indicative of the printer's pre-error print head location after the printer 1 is reset. The time at which this information is saved in EEPROM 5 and the saving procedure itself as well as the copying of such information from EEPROM 5 to RAM 3 is controlled by the CPU 2.

The counter 7 measures the elapse of a predetermined period of time based on an internal clock circuit (not shown in the figures). That is, whenever data is saved to EEPROM 5, the CPU 2 restarts the counter 7 to start counting a time period of predetermined duration. When this predetermined time period has elapsed (1 hour, for example), the counter 7 outputs a signal notifying the CPU 2 that the counted period has elapsed. In response to this signal the CPU 2 acts to save the data groups in the first data set to EEPROM 5. As will be apparent to those skilled in the art, the CPU 2 may be configured to implement the functions of counter 7.

The CPU 2 also has a reset signal detection function 9 and a reset function 10. This reset signal detection function 9 detects when a reset signal has been received from the host computer. When a reset signal is detected, the CPU 2 issues a write command for saving at least part of the printer status data in RAM 3 to EEPROM 5. The reset function 10 is for resetting the printer 1, an operation that includes copying all of the printer status data in EEPROM 5 to RAM 3, returning various printer components (such as the print head) to their initialization positions, and entering a standby state wherein the printer 1 waits for data from the host. When data saving to the EEPROM 5 initiated by the reset signal is completed, the CPU 2 performs the reset function 10. This ensures that data relating to the printer status before the reset are saved in EEPROM 5.

FIG. 3 illustrates the logical structure of the data storage areas in EEPROM 5 and RAM 3, according to the preferred embodiments of the invention. As shown in the figure, EEPROM 5 and RAM 3 (or parts of them) are each logically segmented into six different storage areas designated as Area 1 to Area 6, with each numbered area in EEPROM 5 corresponding to the same numbered area in RAM 3, enabling data exchange between corresponding areas in RAM 3 and EEPROM 5. As noted above, the printer status data is divided into six groups, each of which is assigned to a respective one of the storage areas. Each data group is linked to one or more trigger events which trigger the saving (i.e., updating) of that data group to EEPROM 5. As a result, data updating is accomplished in groups, saving one or a plurality of data groups at a time.

Each of storage areas 1 to 6 includes a data area and a checksum area. When data is copied between a particular area in EEPROM 5 and the corresponding area in RAM 3, the checksum of each copied data group is used for error detection. Each time a data group is copied from a source storage area (in RAM 3 or EEPROM 5) to a destination storage area (in RAM 3 or EEPROM 5) the checksum is calculated based on the copied data group in the destination storage area and compared with the checksum stored for that data group in the source or destination storage area.

Default (initialization) values for the printer status data are stored in ROM 4 or in an area other than Areas 1 to 6 in EEPROM 5. When the checksum comparison reveals a data error for a data group, the printer status data stored in the corresponding storage areas of RAM 3 and EEPROM 5 is replaced with the default values. Thus, these default values assure normal printer operation and also make it possible to minimize printer operating problems when an error occurs.

FIG. 4 is a table showing the relationship between the data storage areas/data groups and the specific control events and predetermined time intervals (i.e., trigger events) which trigger a save operation on a given data group, in accordance with the present invention. An initial step in the control process according to the present invention is to select the trigger events which trigger the saving of certain data groups to their corresponding storage areas. These trigger events include, for example: turning on printer power, lapse of a specific time interval (such as 1 hour), when a specific printer control event occurs (such as print head cleaning, ink cartridge and roll paper replacement, or a printer operating error), when a counter for tracking specific control information changes a predetermined amount (such as when the count value of a counter that tracks the accumulated drive of a roll paper cutter reaches a specific value), and when a reset signal is detected (including reset signals from the host and a reset signal generated when an abnormal voltage is detected).

As described above, in the exemplary embodiment, the printer status data is divided into six data groups, each of which is assigned to one of the six storage areas shown in FIG. 3. According to a preferred embodiment, the printer status data is grouped in the various storage areas as described below:

Area 1: time at which printer power is turned on

Area 2: printed line count since the last print head cleaning event, and total printed line count since printer manufacture Area 3: time of the last print head cleaning event, and the cleaning level Area 4: cumulative drive count of the roll paper cutter Area 5: reset flag, time of the most recent trigger event, ink consumption counter Area 6: various complementary data (such as data to adjust the default value of the carriage travel distance in a given printer).

In the illustrated embodiment, printer status data in a given storage area in RAM 3 is saved in the corresponding storage area in EEPROM 5 when any of the trigger events corresponding to that area, as shown in FIG. 4, occur. For example, when the power to printer 1 is turned on, the data group in storage area 1 (i.e., the current time) is saved in the corresponding area in EEPROM 5. Data groups in storage areas 2 and 5 of RAM 3 are saved in those areas in EEPROM 5 after the lapse of a specific time interval, and data groups in storage areas 2 to 5 are saved in those areas in EEPROM 5 when a specific control event occurs. When a reset occurs, only data in storage area 5 is saved. Each time a counter for counting particular control information changes a certain amount, the data groups in storage areas 2, 4 and 5 are saved. Data stored in storage area 6 is used, for example, to correct the printing position as a result of variations between specific mechanical components of the printer, and is written prior to shipping from the factory and when the printer is repaired. Thus, not all data groups need to be updated at every trigger event, as indicated in FIG. 4.

Thus, as shown in FIG. 4, the data groups in storage areas 2 and 5 constitute the first data set and the data groups in storage areas 2 through 5 constitute the second data set. In addition to the first and second data sets, there are three additional data sets: a third set including only the data group in storage area 1, a fourth set including the data groups in storage areas 2, 4 and 5, and a fifth set including only the data group in storage area 5.

It should be noted that the data group stored in storage area 5 includes information that is related to information stored in other storage areas and is important for printer control. Such information is therefore more frequently saved. However, when a reset signal is detected (which may occur, for example, when there is a power failure or when a voltage drop is detected), only the data in storage area 5 is saved from RAM 3 to EEPROM 5 at that time while the data in other storage areas is not saved.

Figure 5:
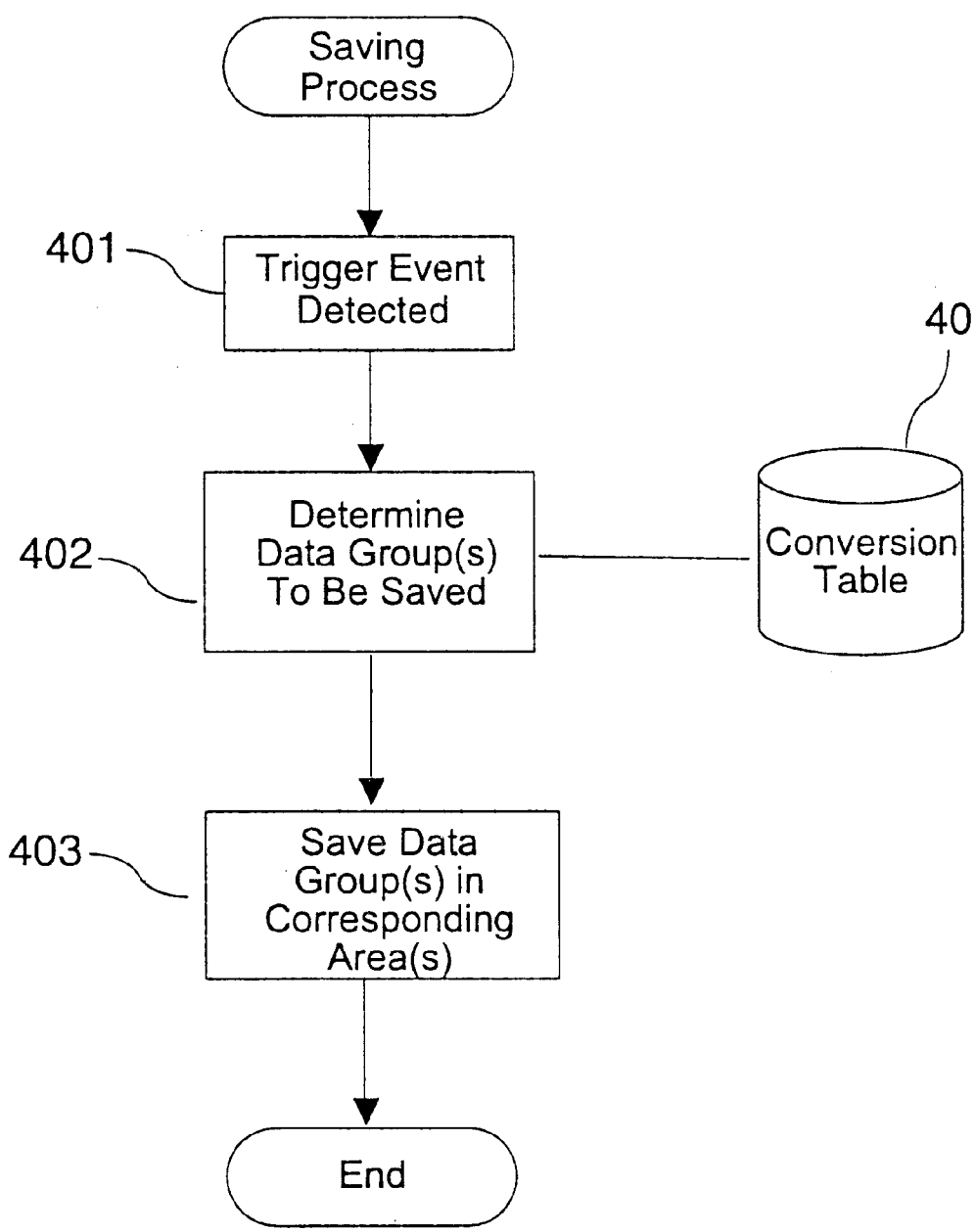
FIG. 5 is a flow chart of a saving process according to the present invention.

A table 40 shown in FIG. 5 and corresponding to that shown in FIG. 4 is stored in ROM 4 or in an area other than Areas 1 to 6 in EEPROM 5, and is read when any of the trigger events stored in the table occurs.

FIG. 5 is a flow chart of a process by which data is saved to EEPROM 5. This flow chart shows the procedure from when one of the trigger events shown in FIG. 4 occurs until the corresponding data group(s) is/are copied from RAM 3 to EEPROM 5. When the CPU 2 detects any of the trigger events (step 401), the conversion table 40 is read and used to determine the data group(s) to be saved in EEPROM 5 (step 402). The thus determined data group(s) is/are then read from RAM 3 and written to the corresponding area(s) in EEPROM 5 (step 403). As a result, only the data group(s) linked to the occurrence of the detected trigger event(s) is/are saved to EEPROM 5.

Figure 6:
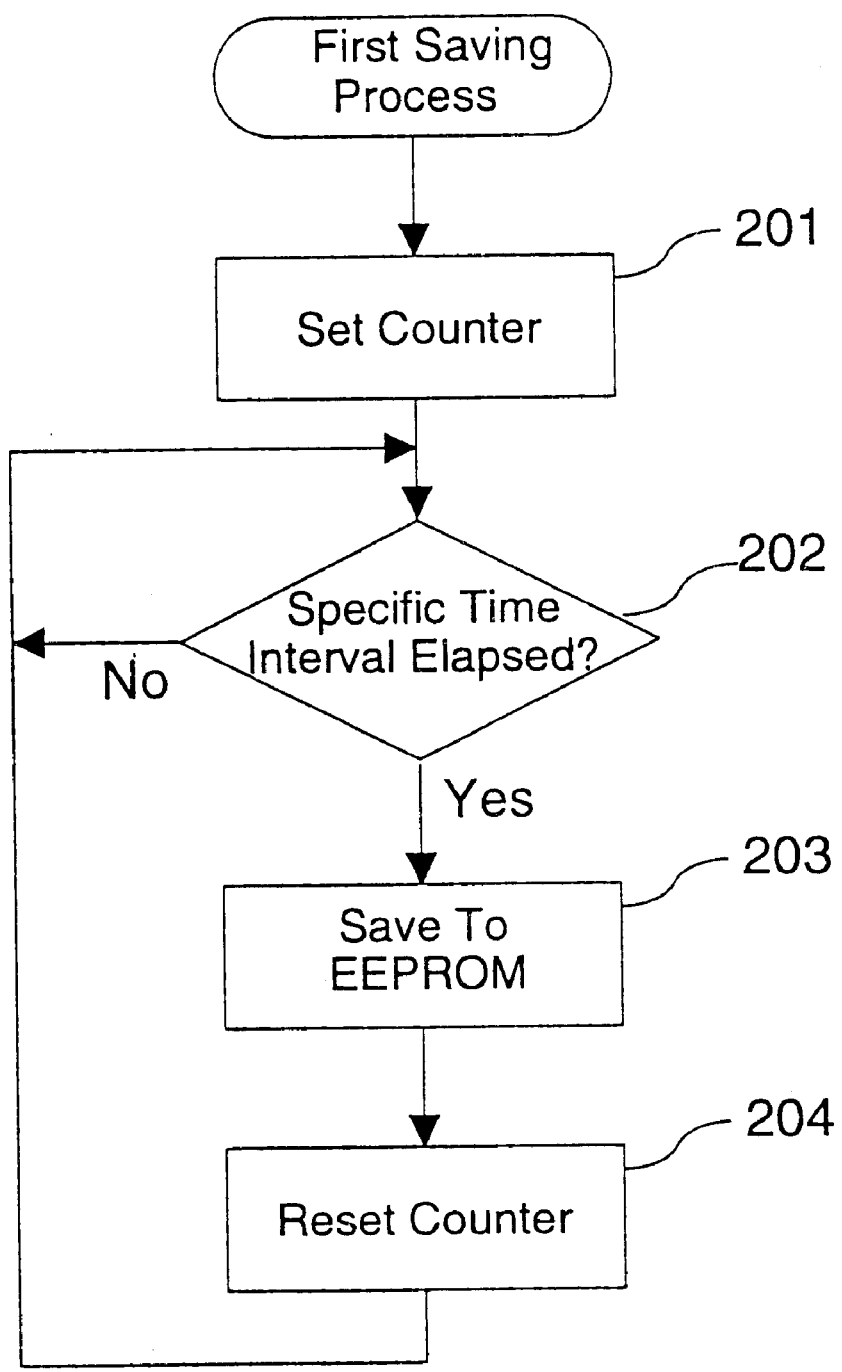
FIG. 6 is a flow chart of a first saving process according to a preferred embodiment of the present invention.
Figure 7:
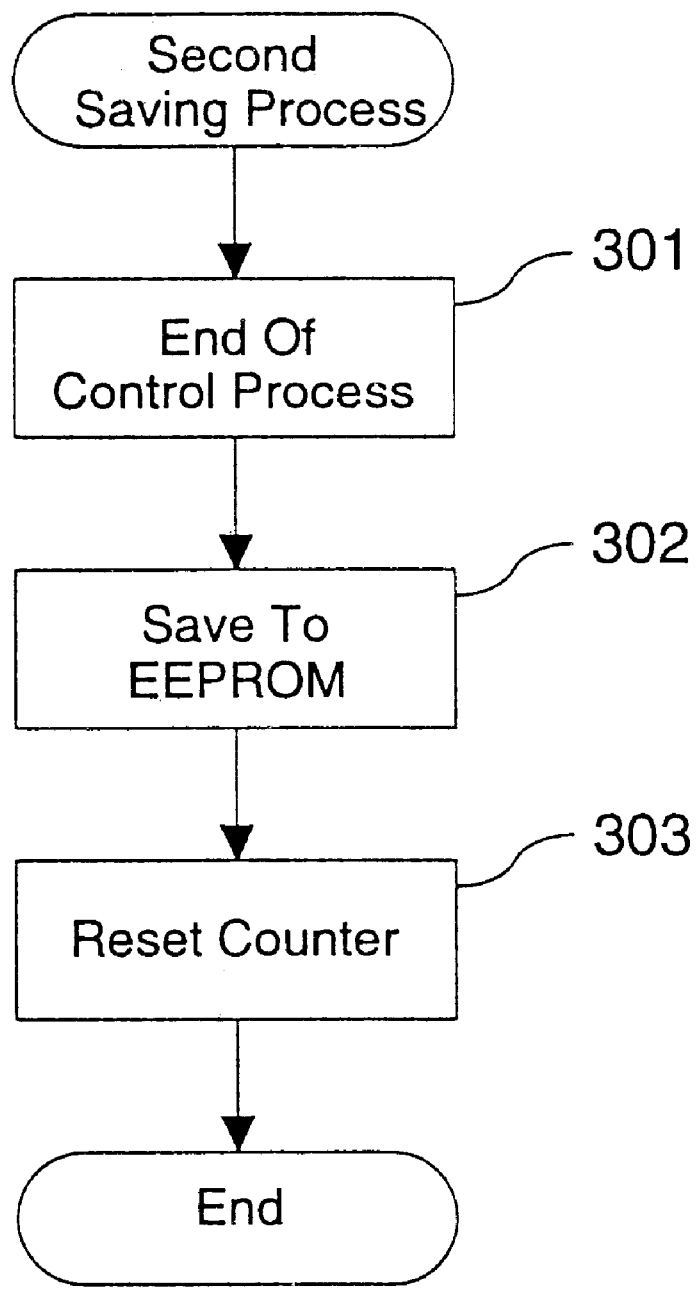
FIG. 7 is a flow chart of a second saving process according to a preferred embodiment of the present invention.

FIG. 6 and FIG. 7 are flow charts illustrating saving processes in printer 1 according to a preferred embodiment of the present invention. FIG. 6 shows the periodic saving process at a predetermined time interval (first saving process), and FIG. 7 shows the event driven saving process (second saving process).

Referring to FIG. 6, data stored in EEPROM 5 is loaded into RAM 3 when the printer 1 is activated, at which time the counter 7 is set to start counting a specific time interval (step 201). When this time interval has elapsed, (i.e., the counter 7 has reached a predetermined count) as determined in step 202, the periodically saved data group(s) is/are saved in EEPROM 5 (step 203). If this interval is 1 hour, for example, these data groups are saved at least once every hour. In the exemplary embodiment, the data groups in Areas 2 and 5 are both saved at this time as shown in FIG. 4.

When the saving of data to EEPROM 5 is completed, the counter 7 is reset and begins counting the next time interval until a corresponding saving operation is executed (step 204). During this time, the first saving process enters a standby mode. As a result, the periodically saved data groups (the data groups in storage areas 2 and 5 in the exemplary embodiment) are saved in EEPROM 5 every time the predetermined time period lapses.

As also described above, in accordance with the invention, certain data is also saved to EEPROM 5 upon the occurrence of a specific control event, that is, at times other than the predetermined time interval described above. As noted above, exemplary control events include: print head cleaning, replacement of the ink cartridge or roll paper, and operating errors such as a specific increase in the print head temperature or disconnection of the carriage transportation belt.

In response to any such trigger event, the second saving process is carried out. More specifically, when it is detected that the control process related to any of the triggering control events is completed (step 301), the control information linked to the completion of that control event (i.e., count values) that has been updated in RAM 3 is saved in EEPROM 5 (step 302). As shown in FIG. 4, the data groups in storage areas 2 to 5 are saved at this time. When the saving of data to EEPROM 5 is completed, counter 7 is reset (step 303). Resetting the counter 7 in step 303 causes the time interval counted in step 202 in FIG. 6 to restart at the completion of the saving process in FIG. 7.

The data group stored in storage area 3 is saved only in step 302 in FIG. 7. On the other hand, the data groups stored in storage areas 2 and 5 are saved to EEPROM 5 both at a specific time interval (step 203 in FIG. 6), and together with the data groups stored in areas 3 and 4 when a specific control event occurs. Even though this may slightly increase the frequency of writing to the EEPROM 5, a drop in printer throughput is prevented because the time interval counter 7 is also reset in step 303.

Figure 8:
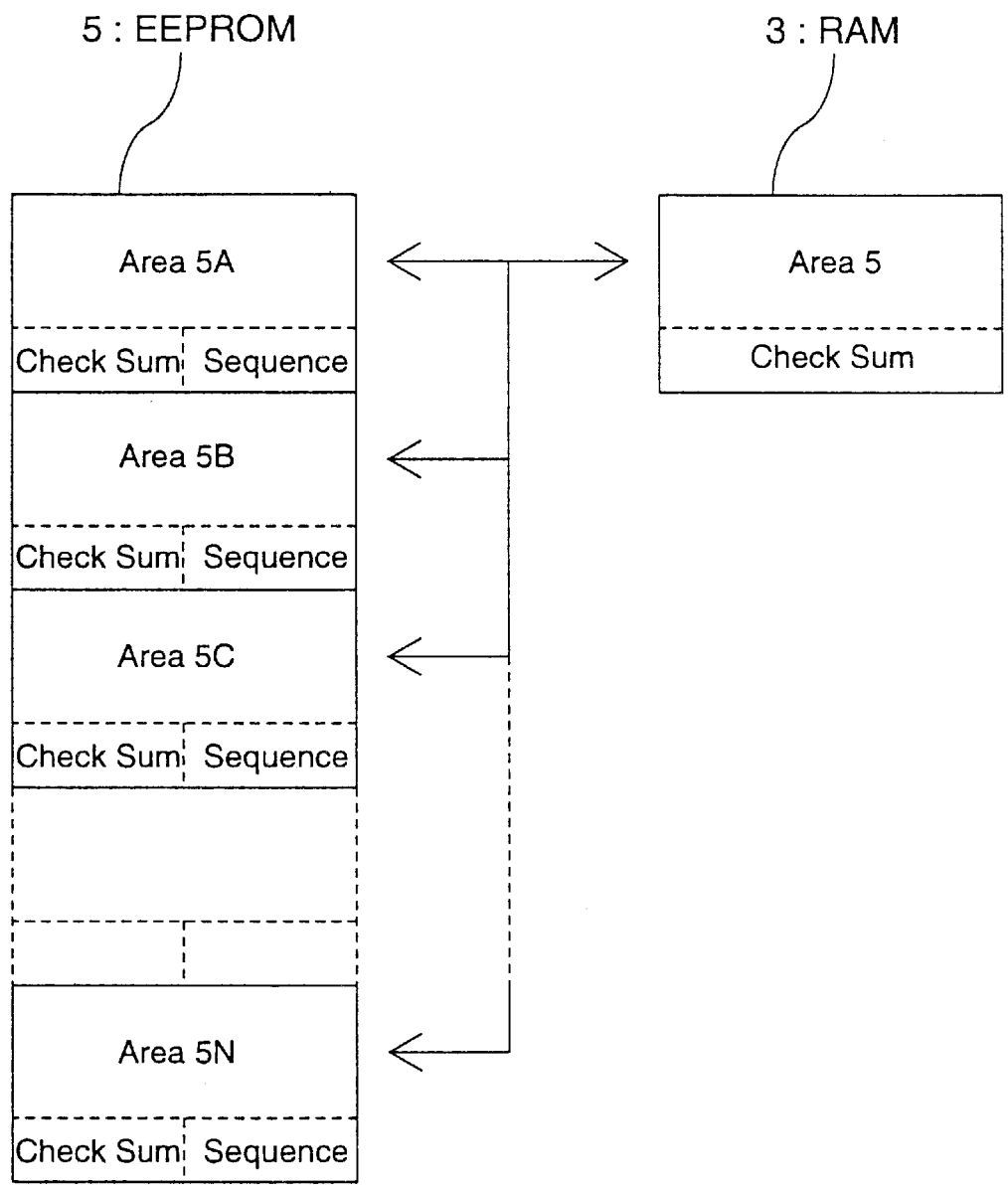
FIG. 8 shows an example of the preferred logical structure of one of the data storage areas shown in FIG. 3. [Key to the Figures]
1 printer
2 CPU
3 RAM
4 ROM
5 EEPROM
6 print mechanism
7 counter
8 interface
9 reset signal detection function
10 reset function

FIG. 8 illustrates the logical structure of data storage area 5 in EEPROM 5 and RAM 3. As the figure shows, storage area 5 in EEPROM 5 is further divided into a plurality of substorage areas 5A to 5N. Each of these substorage areas 5A to 5N includes, in addition to a printer status data storage area, an area for storing a sequence value and a checksum storage area. When the data group in area 5 is saved in EEPROM 5 it is written into a selected one of the subareas which are sequentially and cyclically selected. The sequence value identifies the subarea that holds the most recently saved data.

Referring again to FIG. 5, when the data group in storage area 5 is specified (step 402) and that data group is saved from RAM 3 to EEPROM 5 (step 403), it is written to the substorage area next in sequence after the substorage area last used. For example, if data was written to area 5A the last time step 403 was executed, data is written to area 5B in the present step 403.

In this exemplary embodiment, a 2-byte area is allocated for the sequence value, enabling codes $00_H$ to $FF_H$ to be stored, i.e., the sequence value can assume any value between 0 and 65,536. Each time step 403 is executed, the sequence value is increased or decreased and the updated value is written into the sequence area of the respective subarea.

For example, if data was written to subarea 5A the last time step 403 was executed and a sequence value of 05 is stored in the sequence area of subarea 5A, a value of 06 is stored in the sequence area of subarea 5B in the present step 403.

If the maximum sequence value (65,536 in this embodiment) and the number of subareas are chosen to be different, the sequence value that will be stored in the sequence area of a particular subarea will always be different from the value that was written into the same sequence area the previous time. Therefore, the 10 sequence value stored in the subarea that holds the most recently saved data, and the sequence value stored in the subarea next in sequence will be discontinuous. This discontinuity identifies the subarea that holds the most recently saved data as well as those preceding.

When data is to be loaded from storage area 5 of EEPROM 5 to storage area 5 of RAM 3 (which is not subdivided), the sequence values stored in subareas 5A to 5N of EEPROM 5 are compared to find the above-explained discontinuity to thereby identify the subarea holding the most recent data and to load the most recent data into the storage area SA of RAM 3. For example, if the values stored in the sequence areas of subareas 5A, 5B, and 5C are 05, 06, and F8, the printer status data stored in subarea 5B is the most recent and is therefore loaded into storage area 5 of RAM 3.

As shown in FIG. 4, the data group stored in storage area 5 is saved to nonvolatile memory (i.e., EEPROM 5) whenever a reset signal is detected, and is usually information that is important for printer control. This data group is also saved to nonvolatile memory at various trigger events other than reset signal detection; thus, this data group is more frequently saved than the data groups stored in other areas.

By providing a plurality of substorage areas in area 5 of EEPROM 5 so that the frequently updated data group in area 5 is written sequentially to different memory areas, it is possible to prevent or minimize the decrease in nonvolatile memory life resulting from frequent use of this area of the nonvolatile memory.

Also, by providing a checksum area for storing an error detection code in each substorage area, it is possible, when data corruption is detected in the most recently saved printer status data, to scan and locate the second most recently saved data and check for errors in this data. If there are no errors, the second most recently saved data can then be loaded into RAM 3.

As described above, the present invention writes to only specific areas of nonvolatile memory at defined times, and does not write to the other memory areas. The write time is thereby shortened, and nonvolatile memory life is improved.

Data reliability is also improved because each memory area also contains an error detection code. As a result, stored data can be replaced by default initialization data when an error is detected, and printer operating problems that can occur when an error occurs can be minimized.

Furthermore, by resetting the printer after saving data to nonvolatile memory when a reset signal is detected, normal printer operation can be assured after the printer is reset because the printer status immediately before the reset is stored in nonvolatile memory.

While the invention has been described in conjunction with several specific embodiments, many further alternatives, modifications and variations will be apparent to those skilled in the art in light of the foregoing description. Thus, the invention described herein is intended to embrace all such alternatives, modifications, and variations as may fall within the spirit and scope of the appended claims.

For example, an exemplary embodiment of the present invention has been described using an EEPROM as the nonvolatile memory, but flash memory or other type of nonvolatile memory can be used instead.

In addition, the data stored in nonvolatile memory shall not be limited to that described above. More specifically, data relating to any printer condition can be stored, or only a subset of the above-described printer status data can be stored. Also, data other than printer status data, including font data or program data, can be stored in the nonvolatile memory. The updating of the data may also be linked to trigger events other than those described above.

Although a checksum is used above for error detection, it will be apparent from the foregoing description that other error detection codes, including a parity check code, can be used instead.

A table is also used in the above embodiment for selecting the memory area to be written at a particular writing time; however, it is not necessary to use such a table.

What is claimed is:

1. A method for controlling the saving of information regarding operating conditions in a printer that comprises a nonvolatile memory for storing printer status data relating to the printer operating conditions, and a volatile memory for temporarily storing the printer status data, said method comprising the steps of:

(a) grouping the printer status data into a plurality of different data groups and pre-allocating each of the data groups to a corresponding one of a plurality of storage areas in the volatile memory and in the nonvolatile memory, wherein the saving of each data group to the nonvolatile memory is responsive to at least one of a plurality of trigger events, and wherein at least two of the data groups do not have any common trigger events; and (b) generating a command to save a select number of data groups from the volatile memory to the nonvolatile memory when any one of the trigger events to which the data group or groups to be saved is/are responsive occurs; and (c) saving a particular data group stored in its pre-allocated storage area in the volatile memory to its corresponding storage area in the nonvolatile memory in response to the generated save command when any one of the plurality of trigger events to which that data group is responsive occurs.

2. The method as set forth in claim 1, wherein the plurality of trigger events includes detection of a reset signal from a host computer, and wherein the method further comprises the step of:

(d) resetting the printer based on the detected reset signal after performing step (c).

3. The method as set forth in claim 1, wherein the plurality of trigger events includes lapse of a specific time interval, turning printer power on or off, and specific control events in printer operation.

4. The method as set forth in claim 3, wherein the specific control events in printer operation include print head cleaning.

5. The method as set forth in claim 1, wherein each storage area further contains an error detection code, and the method further comprises the step of:

(d) checking for errors in each data group using the error detection code in the corresponding storage area.

6. The method as set forth in claim 5, wherein step (d) further comprises checking for errors in a particular data group when that data group is read from the nonvolatile memory and temporarily stored in the volatile memory.

7. The method as set forth in claim 5, wherein step (d) further comprises checking for errors in a particular data group after that data group is written to the nonvolatile memory from the volatile memory.

8. The method as set forth in claim 5, further comprising the step of:
(e) writing specific initialization data to each storage area in the volatile memory and the nonvolatile memory from which an error-detected data group is read or to which an error-detected data group is written.

9. A method for controlling the saving of information regarding operating conditions in a printer that comprises a nonvolatile memory for storing printer status data relating to the printer operating conditions, and a volatile memory for temporarily storing the printer status data, said method comprising the steps of:
(a) grouping the printer status data into a plurality of different data groups and pre-allocating each of the data groups to a corresponding one of a plurality of storage areas in the volatile memory and in the nonvolatile memory, wherein the saving of each data group to the nonvolatile memory is responsive to at least one of a plurality of trigger events, the plurality of trigger events including lapse of a specific time interval, turning printer power on or off, and specific control events in printer operation; and
(b) generating a command to save a select number of data groups from the volatile memory to the nonvolatile memory when any one of the trigger events occurs; and
(c) saving a particular data group stored in its pre-allocated storage area in the volatile memory to its corresponding storage area in the nonvolatile memory in response to the generated save command when any one of the plurality of trigger events to which that data group is responsive occurs,
wherein the printer status data is pre-divided into a first data set comprising at least one data group and a second data set comprising at least one data group, and step (c) further comprises the steps of:
(c)(1) saving the first data set to the nonvolatile memory at the lapse of a specific time interval; and
(c)(2) saving the first data set and the second data set to the nonvolatile memory and reinitializing a counter that counts the specific time interval after a specific printer operation control event occurs.

10. A printer comprising:
a nonvolatile memory that stores printer status data relating to printer operating conditions, the printer status data being pre-allocated into a plurality of data groups, the nonvolatile memory having a plurality of storage areas allocated therein, each storage area corresponding to one of the data groups;
a volatile memory that temporarily stores the printer status data, the volatile memory having a plurality of storage areas allocated therein corresponding to the plurality of storage areas allocated in the nonvolatile memory;
a controller that generates a save command to save a select number of the data groups stored in the volatile memory to the nonvolatile memory when any one of a plurality of trigger events to which the data group or groups to be saved is/are responsive occurs; and
a read/write unit that saves a particular data group stored in its pre-allocated storage area in the volatile memory to its corresponding storage area in the nonvolatile memory in response to the generated save command when any one of a plurality of trigger events to which that data group is responsive occurs;
wherein at least two of the data groups do not have any common trigger events.

11. The printer as set forth in claim 10, wherein each storage area comprises a data area for storing its corresponding data group and a checksum area for storing an error detection code.

12. The printer as set forth in any of claim 10, wherein at least one of the plurality of storage areas in the nonvolatile memory is further divided into a plurality of substorage areas.

13. The printer as set forth in claim 12, wherein each substorage area is further divided into a data area and a sequence area for storing sequence data representing the sequence of use of the substorage areas.

14. The printer as set forth in claim 12, wherein each substorage area further comprises a checksum area for storing an error detection code.

15. A printer comprising:
a nonvolatile memory that stores printer status data relating to printer operating conditions, the printer status data being pre-allocated into a plurality of data groups, the nonvolatile memory having a plurality of storage areas allocated therein, each storage area corresponding to one of the data groups;
a volatile memory that temporarily stores the printer status data, the volatile memory having a plurality of storage areas allocated therein corresponding to the plurality of storage areas allocated in the nonvolatile memory;
a controller that generates a save command to save a select number of the data groups stored in the volatile memory to the nonvolatile memory when any one of a plurality of trigger events occurs; and
a read/write unit that saves a particular data group stored in its pre-allocated storage area in the volatile memory to its corresponding storage area in the nonvolatile memory in response to the generated save command when any one of a plurality of trigger events to which that data group is responsive occurs,
wherein the printer status data is pre-divided into a first data set comprising at least one data group and a second data set comprising at least one data group, and wherein the printer further comprises:
a counter that counts a specific time interval;
a monitor that detects an occurrence of any one of the plurality of trigger events, the plurality of trigger events including specific control events in printer operation;
a first read/write unit that saves the first data set to the nonvolatile memory at the lapse of the specific time interval counted by the counter;
a second read/write unit that saves the second data set and the first data set to the nonvolatile memory when the monitor detects the occurrence of at least one specific event in printer operation; and
an initialization unit that initializes the counter when the nonvolatile memory is saved to by the second read/write unit.

16. A medium readable by a device embodying a program of instructions for execution by said device to perform a method for controlling the saving of information regarding operating conditions in a printer that comprises a nonvolatile memory for storing printer status data relating to the printer operating conditions, and a volatile memory for temporarily storing the printer status data, the method comprising:
(a) grouping the printer status data into a plurality of different data groups and pre-allocating each of the data groups to a corresponding one of a plurality of storage areas in the volatile memory and in the nonvolatile memory, wherein the saving of each data group to the nonvolatile memory is responsive to at least one of a plurality of trigger events, and wherein at least two of the data groups do not have any common trigger events; and (b) generating a command to save a select number of data groups from the volatile memory to the nonvolatile memory when any one of the trigger events to which the data group or groups to be saved is/are responsive occurs; and (c) saving a particular data group stored in its pre-allocated storage area in the volatile memory to its corresponding storage area in the nonvolatile memory in response to the generated save command when any one of the plurality of trigger events to which that data group is responsive occurs.

17. The medium as set forth in claim 16, wherein the plurality of trigger events includes detection of a reset signal from a host computer, and wherein the method further comprises the step of:

(d) resetting the printer based on the detected reset signal after performing step (c).

18. The medium as set forth in claim 16, wherein the plurality of trigger events includes lapse of a specific time interval, turning printer power on or off, and specific control events in printer operation.

19. The medium as set forth in claim 18, wherein the specific control events in printer operation include print head cleaning.

20. The medium as set forth in claim 16, wherein each storage area further contains an error detection code, and the method further comprises the step of:

(d) checking for errors in each data group using the error detection code in the corresponding storage area.

21. The medium as set forth in claim 20, wherein step (d) further comprises checking for errors in a particular data group when that data group is read from the nonvolatile memory and temporarily stored in the volatile memory.

22. The medium as set forth in claim 20, wherein step (d) further comprises checking for errors in a particular data group after that data group is written to the nonvolatile memory from the volatile memory.

23. The medium as set forth in claim 20, further comprising the step of:

(e) writing specific initialization data to each storage area in the volatile memory and the nonvolatile memory from which an error-detected data group is read or to which an error-detected data group is written.

24. A medium readable by a device embodying a program of instructions for execution by said device to perform a method for controlling the saving of information regarding operating conditions in a printer that comprises a nonvolatile memory for storing printer status data relating to the printer operating conditions, and a volatile memory for temporarily storing the printer status data, the method comprising:

(a) grouping the printer status data into a plurality of different data groups and pre-allocating each of the data groups to a corresponding one of a plurality of storage areas in the volatile memory and in the nonvolatile memory, wherein the saving of each data group to the nonvolatile memory is responsive to at least one of a plurality of trigger events, the plurality of trigger events including lapse of a specific time interval, turning printer power on or off, and specific control events in printer operation; and (b) generating a command to save a select number of data groups from the volatile memory to the nonvolatile memory when any one of the trigger events occurs; and (c) saving a particular data group stored in its pre-allocated storage area in the volatile memory to its corresponding storage area in the nonvolatile memory in response to the generated save command when any one of the plurality of trigger events to which that data group is responsive occurs, wherein the printer status data is pre-divided into a first data set comprising at least one data group and a second data set comprising at least one data group, and step (c) further comprises the steps of:

(c)(1) saving the first data set to the nonvolatile memory at the lapse of a specific time interval; and (c)(2) saving the first data set and the second data set to the nonvolatile memory and reinitializing a counter that counts the specific time interval after a specific printer operation control event occurs.

* * * * *